United States Patent
Mills

[15] 3,676,324
[45] July 11, 1972

[54] COMPOSITE CARBON ELECTRODE STRUCTURE HAVING IMPROVED ELECTRICAL CONDUCTIVITY

[72] Inventor: King L. Mills, Bartlesville, Okla.
[73] Assignee: Phillips Petroleum Company
[22] Filed: Nov. 7, 1969
[21] Appl. No.: 874,808

[52] U.S. Cl. .................. 204/284, 204/59 R, 204/290 R, 204/294
[51] Int. Cl. ............... B01r 3/04, C23b 5/74, B01r 3/08
[58] Field of Search ........... 204/59 R, 290 R, 284, 294; 133/22

[56] References Cited

UNITED STATES PATENTS

| | | |
|---|---|---|
| 3,017,336 | 1/1962 | Olstowski .................. 204/284 |
| 2,562,150 | 7/1951 | Osborne .................... 204/294 |
| 1,957,940 | 5/1934 | Conradty ................ 204/294 X |
| 3,511,762 | 5/1970 | Childs ..................... 204/294 X |
| 2,275,281 | 3/1942 | Berl ............................ 204/294 |
| 3,423,247 | 1/1969 | Darland, Jr. et al. ....... 136/120 FC |

Primary Examiner—John H. Mack
Assistant Examiner—Regan J. Fay
Attorney—Young and Quigg

[57] ABSTRACT

A carbon electrode structure having improved electrical conductivity is provided. Said carbon electrode structure comprises a first section of carbon, a second section of carbon secured to said first section of carbon, and a layer of finely divided conductive carbon disposed between said first and second sections of carbon.

14 Claims, 6 Drawing Figures

INVENTOR.
K. L. MILLS

BY
ATTORNEYS

COMPOSITE CARBON ELECTRODE STRUCTURE HAVING IMPROVED ELECTRICAL CONDUCTIVITY

This invention relates to composite carbon electrode structures having improved electrical conductivity.

Electrode elements are widely employed in electrolytic apparatus employed in electrochemical conversion processes. Generally speaking, the utilization of such elements involves immersing the element in an electrolyte and passing an electric current from one electrode element through said electrolyte to an oppositely charged electrode element. In one such process a material to be converted is dissolved in the electrolyte and at least a portion of said material is converted into conversion products at one or both of the electrodes. In a variation of this process, the feedstock for the conversion process is bubbled into the electrolyte through a porous electrode element, such as a porous carbon anode, to produce different conversion products.

Very recently it has been discovered that the reaction in an electrochemical conversion process can be carried out within the confines of the porous electrode element itself. This type of operation is of particular utility in electrochemical fluorination because it makes possible a simple one-step route, at relatively high conversions, to partially fluorinated products which had previously been difficult to obtain. Carrying out the fluorination reaction within the pores of the porous anode, in addition to making possible the direct production of partially fluorinated products, also allows operation at higher rates of conversion, and without the formation of substantial amounts of cleavage products generally produced by the older methods when operating at high conversion rates. The feed to be fluorinated is introduced into the porous anode at a point near its bottom and the fluorinated mixture exits at the top of the anode, generally above the electrolyte level. Passage of feed into the bulk of the electrolyte is avoided.

Composite carbon electrode structures comprising a porous section and a less porous or more dense section of carbon secured to said porous section of carbon have been found very useful in electrochemical conversion processes. The section of porous carbon provides a location for carrying out the reaction or conversion. The less porous or more dense section of carbon provides a location for the electrical connection to the electrode. However, a serious problem has existed in providing an electrically efficient contact, connection, or joint between the two or more sections of carbon comprising the composite carbon electrode structure. Merely providing a tight friction fit or joint between the sections of carbon is not satisfactory. There still is obtained more resistance or voltage drop across the joint than is desirable. In general, the use of cement as such joints is undesirable. Many cements are attacked by the electrolyte. Also, many cements are not sufficiently conductive to be useful.

The present invention provides a solution to the above problems. I have now discovered that conductivity between the sections of a composite carbon electrode can be markedly improved by disposing a layer or film of finely divided conductive carbon between the sections of carbon comprising the electrode structure.

An object of this invention is to provide an improved carbon electrode structure. Another object of this invention is to provide a composite carbon electrode structure having improved electrical conductivity, i.e., reduced resistivity or voltage drop, across the joint(s) between the sections of the electrode. Another object of this invention is to provide a composite carbon electrode structure having a film or layer of finely divided carbon disposed between the sections of carbon comprising said structure. Other aspects, objects, and advantages of the invention will be apparent to those skilled in the art in view of this disclosure.

Thus, according to the invention, there is provided a carbon electrode structure, having improved electrical conductivity, comprising: a first section of carbon; a second section of carbon secured to said first section of carbon; and a layer of finely divided carbon disposed between said first and second sections of carbon.

The finely divided carbon employed in the practice of the invention can be any suitable finely divided carbon. Included among the suitable finely divided carbons are carbon black and graphite. The finely divided carbons used in the practice of the invention can have a particle size or average diameter within the range of from about 10 millimicrons to about 100 microns, depending upon the average pore diameter of the carbons employed in fabricating the electrodes of the invention.

Graphite is presently preferred finely divided carbon because of its lubricating properties and superior conductivity properties. Graphite also has a desirable tendency to shear during assembly of the electrode. In some media, such as fluorine-containing media as in the electrochemical fluorination processes using a hydrogen fluoride-containing electrolyte, graphite will swell to form an even tighter bond.

All carbon blacks are conductive. Thus, practically any commercially available carbon black having a suitable particle size, such as furnace black, channel black, acetylene black, etc., can be employed in the practice of the invention. Generally speaking, for a given particle size black, the oil furnace blacks are preferred.

As illustrated in the examples given hereinafter, the finely divided carbon can be applied to the surfaces to be joined in either "wet" condition, e.g., from an aqueous dispersion, or as a dry powder. The amount of finely divided carbon employed in the practice of the invention can be varied within the limits of that necessary to fill the void or clearance between the sections of carbon to be joined. It is not necessary that the film or layer of finely divided carbon between the sections of carbon being joined be a continuous layer or film. The thickness of said layer or film of finely divided carbon can vary from a thickness of one particle up to the machined clearance provided in fabricating the sections of carbon to be joined, e.g., up to about 0.005 inch, or greater. Thus, there really is no limit on the amount of finely divided carbon used in the practice of the invention.

A number of advantages are obtained or realized in the practice of the invention. One outstanding advantage is the provision of an efficient electrical joint or connection between the sections of carbon comprising the composite electrode. The provision of such an efficient electrically conductive joint is important for efficient operation of the electrode because electrolytic cells are generally operate at very low voltages. A poor connection or joint will offer resistance to the flow of current through the electrode. In composite carbon electrode structures of the prior art, machining of the carbon elements to be joined so as to obtain a proper fit has been relied upon. The present invention avoids the criticality of machining the various carbon sections to close tolerances. This is especially important in fabricating electrode elements of porous carbon, which is reasonably fragile. Thus, in fabricating generally cylindrical electrodes comprising a hollow cylindrical web having a rod disposed therein, the machining tolerances can be relaxed. Another advantage of the invention is that it is not necessary to rely upon a cement or other adhesive so as to hold the sections of carbon together. The layer or film of finely divided carbon employed in accordance with the invention will fill the void or clearances between the sections of carbon and thus, in most instances, improve the friction fit to the extent that the friction fit can be relied upon.

In FIG. 1 it will be noted that the carbon sections of the electrode taper outwardly from top to bottom.

In FIG. 2 it will be noted that the carbon sections of the electrode taper inwardly from top to bottom.

In FIG. 3 the carbon sections of the electrode are generally cylindrical and do not have a taper.

In FIG. 4 the electrode is generally rectangular in shape.

Figure 5:
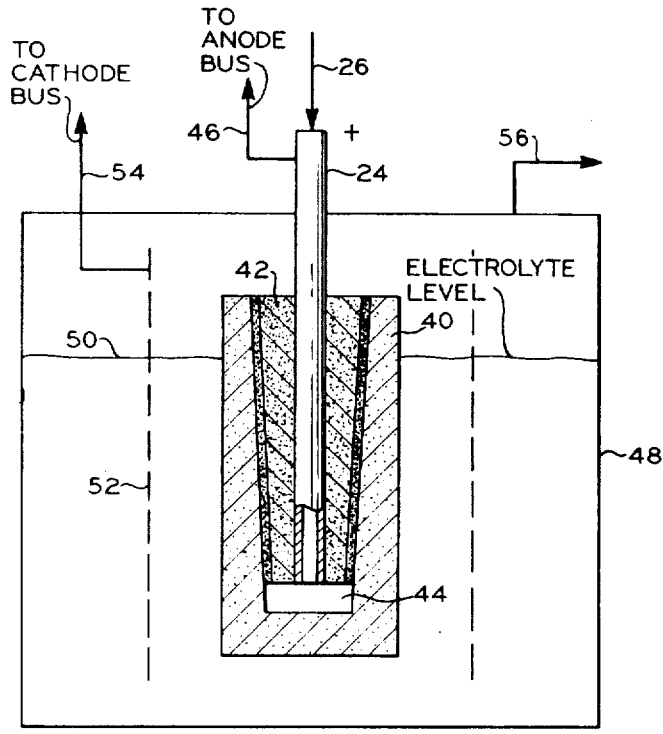

FIG. 5 is a diagrammatic illustration of another composite carbon electrode, partly in cross section, in accordance with the invention. In FIG. 5 one end of the outer section of the electrode is closed. FIG. 5 also illustrates diagrammatically the use of an electrode in accordance with the invention in an electrolytic cell.

Figure 1:
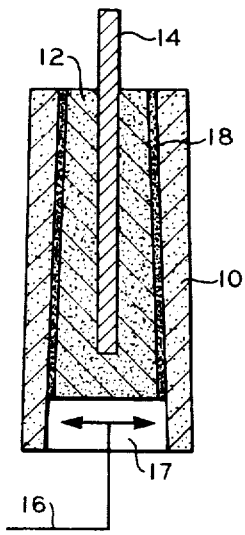
FIG. 1 is a diagrammatic illustration, in cross section, illustrating one composite carbon electrode in accordance with the invention.

Referring now to the drawings, wherein like reference numerals are employed to refer to like elements, the invention will be more fully explained. In FIG. 1 there is illustrated a composite carbon electrode structure comprising a first section of porous carbon 10 which is generally cylindrical in shape and is hollow. A second section of less porous carbon 12 has the general shape of a generally cylindrical rod and is disposed within said first section of carbon 10 and secured therein by a friction fit. A current collector 14, here shown to be a metal rod such as copper, extends into said second section of carbon 12. Said current collector can be disposed in a hole drilled to fit and accommodate the metal rod, or said current collector can be threaded into said second section of carbon. First section of carbon 10 extends at one end thereof beyond one end of said second section 12 of carbon. The bottom surface of said second section of carbon 12 together with the inner surfaces of said extended portion of said first section of carbon 10 define a cavity in the lower portion of the electrode. Said cavity is provided for the introduction of a feedstock by means of conduit 16 into the pores of first section of carbon 10. The inner wall of said first section of carbon 10 and the outer wall of said second section of carbon 12 are each provided with a taper from the upper end to the lower end of the electrode structure, and the taper on said first section 10 is complementary to the taper on said second section 12 so as to improve the friction fit. A layer of finely divided carbon 18 is disposed between the inner wall of said first section of carbon 10 and the outer wall of said second section of carbon 12.

Figure 2:
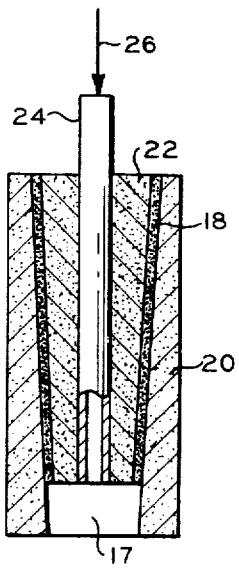
FIG. 2 is a diagrammatic illustration, partly in cross section, illustrating another composite carbon electrode in accordance with the invention.

In FIG. 2 the electrode structure is similar to that of FIG. 1. The first section of carbon 20 comprises a porous carbon and the second section of carbon 22 comprises a less porous or more dense carbon than the carbon of said first section 20. A layer of finely divided carbon 18 is disposed between the inner wall of first section of carbon 20 and the outer wall of second section of carbon 22. In this electrode of the invention, the current collector 24 comprises a hollow conduit through which a feedstock to be converted can be introduced via conduit 26 and passed through said current collector into the cavity 17 in the lower portion of the electrode. In this electrode first section of carbon 20 tapers inwardly from top to bottom, and said second section of carbon 22 tapers inwardly from top to bottom in a complementary taper. If desired, the current collector 24 can be a solid rodlike current collector 14 in FIG. 1. In this instance, the feedstock to be converted would be introduced into the cavity 17 in a manner similar to that illustrated in FIG. 1.

Figure 3:
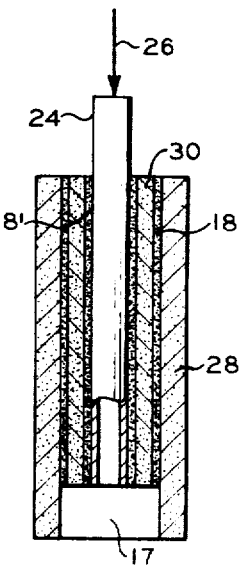
FIG. 3 is a diagrammatic illustration, partly in cross section, of another composite carbon electrode in accordance with the invention.

The electrode structure illustrated in FIG. 3 is generally cylindrical in shape like that of FIGS. 1 and 2. However, first section of carbon 28 and said second section of carbon 30 are not tapered as in the electrodes of FIGS. 1 and 2.

Figure 4:
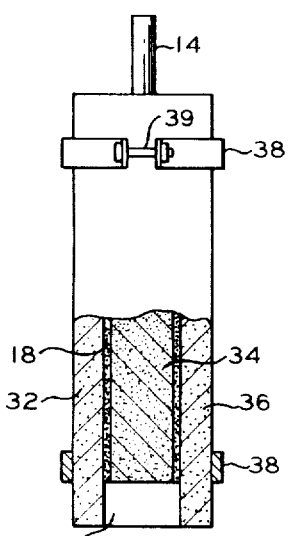
FIG. 4 is a diagrammatic illustration, partly in cross section, of another composite carbon electrode in accordance with the invention.
Figure 4A:
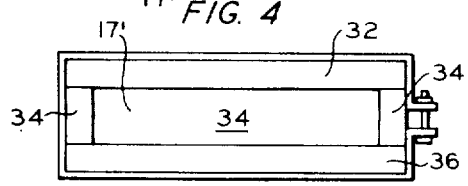

The electrode structure illustrated in FIG. 4 is generally rectangular in shape. Said electrode comprises a rectangular-shaped first section 32 of porous carbon, a second rectangular-shaped section 34 of less porous or dense carbon, and a third rectangular-shaped section of porous carbon 36. A layer or film of finely divided carbon 18 is disposed between said first and second sections of carbon and also between said second and third sections of carbon. A current collector 14 is mounted in said second section of carbon, similarly as in FIG. 1, by a friction fit. Said first section of carbon 32 and said third section of carbon 36 extend below said second section of carbon 34 on the sides of the electrode as indicated in FIG. 4. Said second section of carbon 34 extends downwardly at the ends of the electrode to the same level as the ends of said first and third sections of carbon, as shown in FIG. 4a to form cavity 17'. A pair of clamp means 38 comprising a band of metal and a bolt 39 are provided for securing said sections of carbon together. Said FIG. 4a is a bottom view of the electrode of FIG. 4, and shows the cavity 17' formed in the bottom of the electrode. A reactive feedstock can be introduced into said cavity for introduction into the pores of first and third sections 32 and 36 of porous carbon, similarly as illustrated in FIG. 1.

Referring now to FIG. 5, there is illustrated another electrode in accordance with the invention and a cell arrangement in which the electrodes of the invention can be employed. In FIG. 5 the electrode is being employed as an anode in an electrochemical fluorination process for the electrochemical fluorination of organic compounds. Said anode comprises a first section 40 of porous carbon which is generally cylindrical in shape and is closed at the lower end thereof. A second section 42 comprises a dense, essentially nonporous carbon and is in the general shape of a cylindrical rod which extends into said first section of carbon to a point adjacent the closed end thereof so as to provide an enclosed space 44 within said first section of carbon and below said second section of carbon. A metal current collector 24 comprising a hollow conduit, similarly as in FIGS. 2 and 3, extends through said second section of carbon into communication with said enclosed space 44 for the introduction of a reactive feedstock via conduit 26 and through said current collector 24 into said enclosed space 44. A suitable lead wire 46 is connected to current collector 24 in any suitable manner and serves to connect said anode to the anode bus of the current supply. Said anode is mounted in a suitable cell or container 48 which contains a suitable electrolyte, e.g., essentially anhydrous KF·2HF. It will be noted that the upper end of the anode extends above the electrolyte level 50. A circular cathode 52, which can be a screen formed of a suitable metal such as stainless steel, depending upon the nature of the electrolyte, surrounds said anode and is connected to the cathode bus of the current supply by a suitable lead wire 54. In the operation of the cell arrangement of FIG. 5, a feedstock is introduced into the space 44 within the anode via conduit current collector 24, enters the pores of porous section 40 from said space 44, travels upward through the pores of said porous carbon, and exits from the upper end of said porous section above electrolyte level 50. During passage through said anode at least a portion of the feedstock is electrochemically converted. Conversion products together with remaining unconverted feedstock, and possibly some electrolyte vapors, are withdrawn via conduit 56 from the space above the electrolyte within container 48 and passed to a suitable separation means (not shown) for recovery of products.

It is also within the scope of the invention to provide, in the electrodes of the invention, a layer or film of finely divided carbon 18' at the joint or connection between the current collector and the section of carbon said current collector is disposed in. For example, see 18' in FIG. 3. This feature of the invention is particularly advantageous in large electrodes.

In the sections of the composite electrodes of the invention which comprise porous carbon, the average pore diameter can be generally in the range of 1 to 150 microns, preferably between 40 and 140, and still more preferably between 50 and 120, microns. These values depend somewhat on the depth of immersion of the electrode, with deeper immersions requiring somewhat smaller pores within the above ranges. Generally, the permeability of such porous carbons will be in the range of 0.5 to 75 darcys, preferably from about 5 to about 75, and still more preferably from about 10 to about 70, darcys. In general, the total porosity can be in the range of about 15 to about 60 percent.

The less porous or more dense core or center section of the electrodes of the invention can have a pore size within the range of about 0.01 to 35, preferably 0.1 to 10, microns average diameter with no significant amount of pores having a diameter exceeding 70 microns.

The electrode assemblies of the invention can be employed in any convenient cell configuration or electrode arrangement. The electrode assemblies of the invention can be employed in a wide variety of electrochemical conversion processes in which the porous electrode element is not wetted by the particular electrolyte being used and wherein the reaction takes place within the confines of the electrode. Some examples of such processes are electrochemical halogenation, electrochemical cyanation, and cathodic conversions such as the reduction of alcohols to hydrocarbons or the reduction of acids to alcohols. One electrochemical conversion process in which the electrode assemblies of the invention are particularly valuable is the electrochemical fluorination of fluorinatable materials in the presence of an essentially anhydrous liquid hydrogen fluoride-containing electrolyte.

For example, the above-described electrodes can be employed as an anode in an electrolytic cell like that illustrated in FIG. 5. Such a cell can be employed for electrochemically fluorinating inorganic and organic materials under suitable operating conditions depending upon the material being fluorinated. For example, in the conversion of ethylene dichloride to dichlorotetrafluoroethane (Freon 114) and other fluorinated materials using an essentially anhydrous KF·2HF electrolyte, typical operating conditions are as follows:

| | |
|---|---|
| Cell temperature | 93° C. |
| Ethylene dichloride conversion | 41% |
| Feed rate | 1.43 moles/hr |
| Faradays/hr | 2.22 |
| Moles product/hr | 0.592 |
| Faradays/mole | 1.55 |
| Current density | 178 ma/cm² |
| By-products[1] | 13.8% |

(1) Products other than Freon 114 or convertible to Freon 114 on recycle.

Further details of an electrochemical fluorination process in which the electrodes of the invention can be employed as anodes can be found in copending application Ser. No. 683,089, filed Nov. 2, 1967, by H. M. Fox and F. N. Ruehlen, now U.S. Pat. No. 3,511,760. See also U.S. Pat. 3,461,049 and 3,461,050 issued Aug. 12, 1969, to W. V. Childs.

The following examples will serve to further illustrate the invention.

EXAMPLE I

A generally cylindrical tapered electrode having a configuration substantially like that illustrated in FIG. 2 was assembled. The web or first section of porous carbon 20 had a length of approximately 12 inches. The diameter of cavity 17 at the bottom of the electrode was approximately 2.25 inches. In the particular electrode employed the core or center section 22 extended about 6 inches above the top of the first or outer section 20. Current collector 24 was a copper pipe having an outside diameter of about 0.75 inch. Said current collector was mounted in center section or core 22 by a tight friction fit. Prior to assembling the web 20 and the core 22 the resistance across the core to current collector joint was measured employing a standard procedure. Said measurements were taken at 1 inch intervals from the top to the bottom. Said core or center section 22 was then inserted manually into the web or outer section 20 by employing a twisting motion. The resistance across the web and core to the current collector was then measured employing a standard procedure. The procedure employed in measuring said resistivities comprised passing a DC current of 2 amperes per square inch through the outer surface of the core 22, or the outer surface of the web 20 on the completed anode, to the current collector 24 in the center of the electrode, and measuring the voltage drop in millivolts. Said voltage drop was measured at 1 inch intervals over the length of the electrode. The results of said measurements are set forth in Table I below.

The core or center section 22 was then removed from the web or outer section 20 and painted with a thick aqueous paste of a commercial grade of oil furnace carbon black having an average particle diameter of 29 millimicrons. Said paste or slurry of carbon black contained 23.0 percent carbon black and 77 percent water. The electrode was then reassembled and the resistivity measurements repeated. The results of said measurements are set forth in Table I below.

The electrode was again disassembled, the core or center section 22 was cleaned, and then painted with a thin waterlike slurry of said carbon black in water which contained 16.7 percent carbon and 83.3 percent water. The electrode was then reassembled and the resistivity measurements repeated. The results of said measurements are set forth in Table I below.

TABLE I

| Distance from top of web, inches | Current Collector to Core | Resistivity—Millivolts Current Collector to Web | | |
|---|---|---|---|---|
| | | No carbon black between core & web | core painted with thick slurry | core painted with thin slurry |
| 0 | 2.1 | 7.7 | 5.5 | 4.6 |
| 1 | 2.1 | 6.8 | 5.1 | 4.0 |
| 2 | 2.1 | 5.5 | 4.0 | 3.4 |
| 3 | 2.1 | 4.6 | 3.9 | 3.4 |
| 4 | 2.2 | 4.2 | 4.1 | 3.6 |
| 5 | 2.2 | 4.3 | 4.2 | 3.7 |
| 6 | 2.3 | 4.4 | 4.6 | 3.9 |
| 7 | 2.4 | 4.8 | 4.4 | 4.1 |
| 8 | 2.2 | 5.1 | 4.5 | 4.1 |
| 9 | 2.3 | 5.7 | 4.7 | 3.9 |
| 10 | 2.6 | 6.9 | 4.9 | 4.3 |
| 11 | – | 8.7 | 5.9 | 5.5 |

The results of the above measurements set forth in Table I show that the resistivity of the joint between core or center section 22 and web or outer section 20, as measured by the millivolt drop, was in the range of 20 to 40 percent less when the layer or film of finely divided carbon black was present at said joint.

EXAMPLE II

Two other test runs were made employing an electrode essentially like that employed in Example I, and employing the same carbon black in the joints of the electrode. In these runs the carbon black was applied dry to the joint surfaces and the excess removed therefrom by rubbing with a cloth. In Run No. 1 only the surface of the core or center section 22 was treated with carbon black and the electrode was reassembled dry. In Run No. 2, the surface of both the core or center section 22 and the web or outer section 20 were treated with carbon black, the excess removed by rubbing with a cloth, and the electrode reassembled dry. The results of the resistivity tests in Runs 1 and 2 are set forth in Table II below.

TABLE II

| | Resistivity, millivolts | | | | | | | | | |
|---|---|---|---|---|---|---|---|---|---|---|
| | Bare surfaces—no carbon black | | | Surface(s) treated with carbon black | | | | | | |
| | Current collector to core a | Current collector to web | Core to web | Current collector to core b | Current collector to web | | Core to web | | Percent reduction in mv. | |
| Distance from top of web, inches | | | | | Run 1 | Run 2 | Run 1 | Run 2 | Run 1 | Run 2 |
| 0 | 2.1 | 7.7 | 5.6 | 6.2 | | | | | | |
| 1 | 2.1 | 6.8 | 4.7 | 5.4 | 10.1 | 10.4 | 4.7 | 5.0 | 0 | —6 |
| 2 | 2.1 | 5.5 | 3.4 | 5.0 | 7.6 | 7.8 | 2.6 | 2.8 | 23 | 18 |
| 3 | 2.1 | 4.6 | 2.5 | 4.7 | 6.9 | 6.9 | 2.2 | 2.2 | 12 | 12 |
| 4 | 2.2 | 4.2 | 2.0 | 4.5 | 6.4 | 6.3 | 1.8 | 1.8 | 10 | 10 |
| 5 | 2.2 | 4.3 | 2.1 | 4.6 | 6.4 | 6.3 | 1.8 | 1.7 | 14 | 19 |
| 6 | 2.3 | 4.4 | 2.1 | 4.7 | 6.7 | 6.5 | 2.0 | 1.8 | 5 | 14 |
| 7 | 2.4 | 4.8 | 2.4 | 5.0 | 7.1 | 6.8 | 2.1 | 1.8 | 12 | 25 |
| 8 | 2.2 | 5.1 | 2.9 | 5.0 | 7.4 | 7.3 | 2.4 | 2.3 | 17 | 14 |
| 9 | 2.3 | 5.7 | 3.4 | 5.2 | 7.9 | 8.0 | 2.7 | 2.8 | 20 | 18 |
| 10 | 2.6 | 6.9 | 4.3 | 5.6 | 8.7 | 8.9 | 3.1 | 3.3 | 28 | 23 | a Surface of copper current collector was polished.
b Oxidized surface on copper current collector.

The results of the above tests set forth in Table II show that the dry carbon black also reduced the resistivity of the joint between the core and the web of the electrode by an amount within the range of from 10 to 25 percent. Said data also indicate that it is preferred to coat both the surface of the core and the surface of the web with the dry carbon black.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

I claim:

1. A carbon electrode structure, having improved electrical conductivity, comprising: a first section of porous carbon having a defined surface; a second section of carbon, less porous than said first section of carbon, having a defined surface, and secured throughout a major portion of said surface thereof to said surface of said first section of carbon with said surface of said first section of carbon covering at least the major portion of said surface of said second section of carbon; and a layer of finely divided carbon disposed between said defined surfaces of said first and second sections of carbon.

2. A carbon electrode structure according to claim 1 wherein: said first section of carbon is generally cylindrical in shape, is hollow, and the inner wall thereof comprises said defined surface thereof; said second section of carbon has the general shape of a generally cylindrical rod and the outer wall thereof comprises said defined surface thereof; and said second section of carbon is disposed within said first section of carbon and secured therein by a friction fit.

3. A carbon electrode structure according to claim 2, suitable for use as an electrode in an electrochemical conversion process, and wherein: a metal current collector is mounted in said second section of carbon.

4. A carbon electrode structure according to claim 3 wherein: said first section of carbon extends at one end thereof beyond one end of said second section of carbon; and the bottom surface of said second section of carbon together with the inner surfaces of said extended portion of said first section of carbon define a cavity.

5. A carbon electrode structure according to claim 4 wherein said current collector comprises a hollow conduit and extends through said second section of carbon to said cavity for introducing a reactive feedstock into said cavity.

6. A carbon electrode structure according to claim 2 wherein the inner wall of said first section of carbon and the outer wall of said second section of carbon are each provided with a taper from one end to the other end, and the taper on said first section is complementary to the taper on said second section so as to improve said friction fit.

7. A carbon electrode structure according to claim 2, suitable for use as an electrode in an electrochemical conversion process, and wherein: said first section of carbon comprises a porous carbon and is closed at one end; said second section of carbon comprises a dense essentially nonporous carbon and extends into said first generally cylindrical first section of carbon to a point adjacent said closed end thereof so as to provide an enclosed space within said first section of carbon and below said second section of carbon; and a metal current collector comprising a hollow conduit extends through said second section of carbon into communication with said enclosed space.

8. A carbon electrode structure according to claim 7 wherein the inner wall of said first section of carbon and the outer wall of said second section of carbon are each provided with a taper from one end to the other end, and the taper on said first section is complementary to the taper on said second section so as to improve said friction fit.

9. A carbon electrode structure according to claim 1 wherein: said first and second sections of carbon are generally rectangular in shape; said first section of carbon is disposed on one side of said second section of carbon; a first layer of finely divided carbon is disposed between said first and second sections of carbon; a third section of carbon generally rectangular in shape is disposed adjacent to said second section of carbon on the side thereof opposite from said first section of carbon; a second layer of finely divided carbon is disposed between said second and third sections of carbon; and a fastening means is provided for securing said first, second, and third sections of carbon together.

10. A carbon structure according to claim 9, suitable for use as an electrode in an electrochemical conversion process, wherein: said first and third sections each comprise a porous carbon and said second section is less porous than said first and third sections; and a metal current collector is mounted in said second section of carbon.

11. A carbon structure according to claim 1 wherein said layer of finely divided carbon consists essentially of graphite.

12. A carbon structure according to claim 1 wherein said layer of finely divided carbon consists essentially of carbon black.

13. A carbon electrode structure according to claim 1 wherein said finely divided carbon has a particle size within the range of from about 10 millimicrons to about 100 microns.

14. A carbon electrode structure according to claim 13 wherein said layer of finely divided carbon has a thickness of up to about 0.005 inch.

* * * * *

UNITED STATES PATENT OFFICE

CERTIFICATE OF CORRECTION

Patent No. 3,676,324                            Dated: July 11, 1972

King L. Mills

It is certified that error appears in the above-identified patent and that said Letters Patent are hereby corrected as shown below:

Column 7, lines 36-45 (entire claim 1), please delete entire passage and insert the following corrected claim 1 therefor -- 1. A carbon electrode structure, having improved electrical conductivity, comprising: a first section of porous carbon for receiving a reactive feedstock into the pores thereof, and having a defined contact surface comprising a major portion of a wall of said first section; a second section of carbon, less porous than said first section of carbon, having a defined contact surface comprising a major portion of a wall of said second section, and secured throughout a major portion of said contact surface thereof to a major portion of said contact surface of said first section of carbon with said contact surface of said first section of carbon covering at least the major portion of said contact surface of said second section of carbon so that the contact area between said sections of carbon comprises a major portion of said walls; and a layer of finely divided carbon disposed between said defined contact surfaces of said first and second sections of carbon. --

Signed and sealed this 9th day of January 1973.

(SEAL)
Attest:

EDWARD M. FLETCHER, JR.                          ROBERT GOTTSCHALK
Attesting Officer                                      Commissioner of Patents